(12) United States Patent
Ponert et al.

(10) Patent No.: US 8,174,356 B2
(45) Date of Patent: May 8, 2012

(54) RFID ENABLED ACCESS CONTROL SYSTEM

(75) Inventors: Gregor Ponert, Salzburg (AT); Rudolf Gosler, Hallein (AT)

(73) Assignee: SkiData AG, Grödig/Salzburg (AT)

( * ) Notice: Subject to any disclaimer, the term of this patent is extended or adjusted under 35 U.S.C. 154(b) by 1208 days.

(21) Appl. No.: 11/891,034

(22) Filed: Aug. 8, 2007

(65) Prior Publication Data

US 2009/0051482 A1 Feb. 26, 2009

(30) Foreign Application Priority Data

Aug. 8, 2006 (EP) ..................................... 06016586

(51) Int. Cl.
| | |
|---|---|
| G05B 19/00 | (2006.01) |
| G08B 13/00 | (2006.01) |
| G08B 13/14 | (2006.01) |
| B60R 25/00 | (2006.01) |
| H04Q 5/22 | (2006.01) |
| H01Q 11/12 | (2006.01) |
| G06K 9/00 | (2006.01) |
| H04N 1/40 | (2006.01) |

(52) U.S. Cl. ................. 340/5.61; 340/572.4; 340/572.7; 340/5.53; 340/5.7; 340/10.1; 343/742; 382/100; 382/115; 358/3.28

(58) Field of Classification Search ........................ None
See application file for complete search history.

(56) References Cited

U.S. PATENT DOCUMENTS

| | | | | |
|---|---|---|---|---|
| 4,539,558 A | * | 9/1985 | Fearon | 340/572.2 |
| 5,321,412 A | | 6/1994 | Kopp et al. | |
| 5,661,457 A | * | 8/1997 | Ghaffari et al. | 340/572.7 |
| 5,764,127 A | * | 6/1998 | Hore et al. | 336/143 |
| 5,831,571 A | * | 11/1998 | Rickett | 342/62 |
| 7,084,769 B2 | * | 8/2006 | Bauer et al. | 340/572.7 |

(Continued)

FOREIGN PATENT DOCUMENTS

DE 10 2004 013 965 B3 12/2005

(Continued)

OTHER PUBLICATIONS

RFID and Contactless Smart Card Applications, Paret, John Wiley & Sons, Ltd., 2005, pp. 254-259, pp. 262-264.

(Continued)

Primary Examiner — George Bugg
Assistant Examiner — Renee Dorsey
(74) Attorney, Agent, or Firm — Miller Canfield Paddock & Stone PLC; Mark L. Maki

(57) ABSTRACT

An access control system with at least one entrance lane (4) has two or more antenna coils (12 to 15) arranged in pairs mutually opposing each other. Each antenna coil pair (12, 13 or 14, 15) is actuated by a reading device (20) for reading out a transponder (22) carried by the user, the transponder (22) having a transponder coil (24) coupleable with the antenna coils (12 to 15). The two mutually opposing antenna coils (12, 13 or 14, 15) of a pair are actuated at the same time, but alternately either in an in-phase or antiphase operation mode. For reading out the transponder (22) carried by the user the one operation mode, with which the transponder (22) is detected, is maintained until the reading transaction is completed.

8 Claims, 2 Drawing Sheets

U.S. PATENT DOCUMENTS

| | | | |
|---|---|---|---|
| 7,225,992 B2 * | 6/2007 | Forster | 235/492 |
| 7,430,306 B1 * | 9/2008 | Osborn et al. | 382/115 |
| 2002/0117543 A1 | 8/2002 | Kocznar et al. | |
| 2007/0001002 A1 | 1/2007 | Ponert et al. | |
| 2007/0146163 A1 * | 6/2007 | Annoni et al. | 340/932.2 |

FOREIGN PATENT DOCUMENTS

| | | | |
|---|---|---|---|
| JP | 2000011107 A * | 1/2000 | |
| WO | WO 01/03237 A1 | 1/2001 | |
| WO | WO 01/22529 A1 | 3/2001 | |

OTHER PUBLICATIONS

RFID-Handbuch, Finkenzener, Carl Hanser Verlag Muenchen Wien, 2000, pp. 332-333.

* cited by examiner

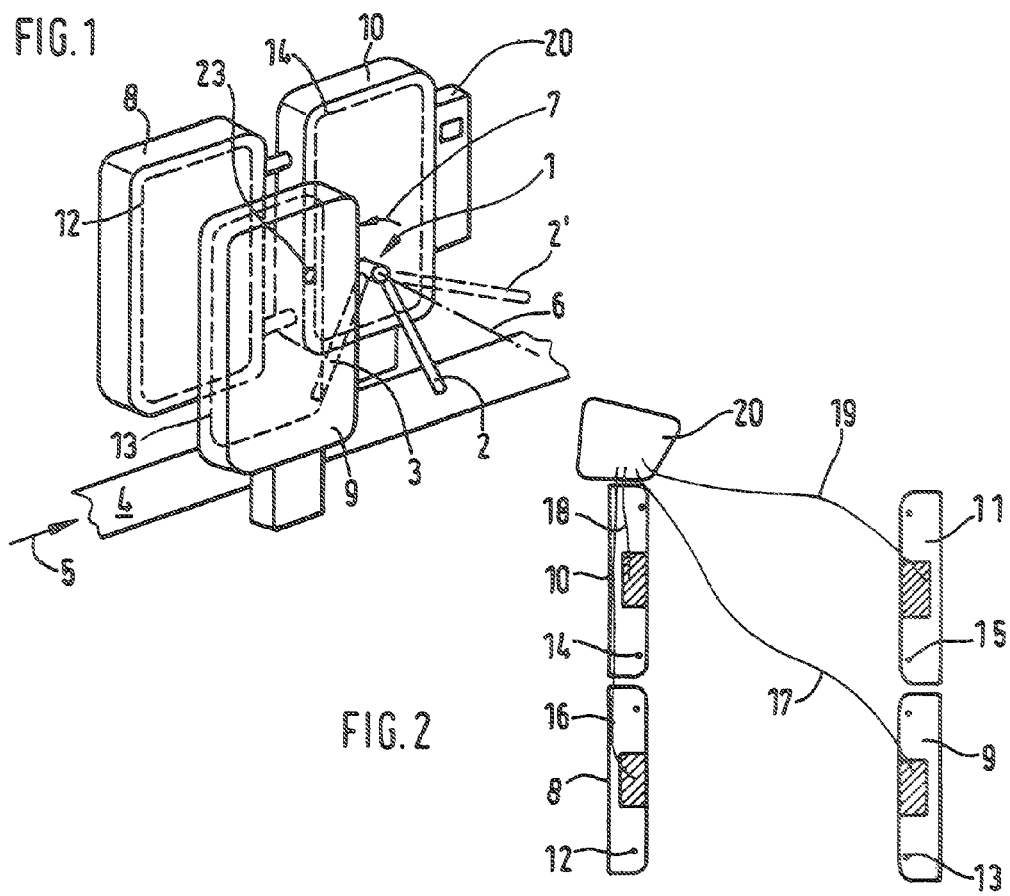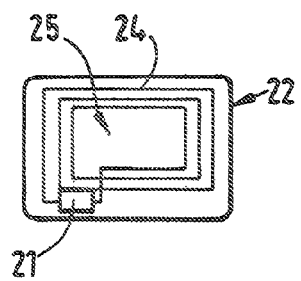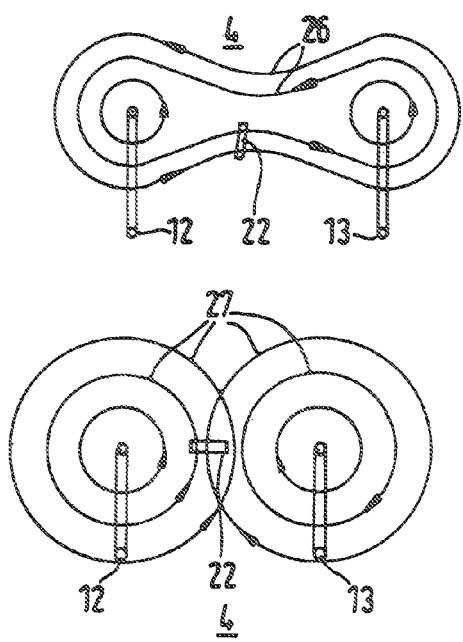

RFID ENABLED ACCESS CONTROL SYSTEM

The invention relates to an access control system having a blocking system and access control means for detecting access privileges.

Such access control systems are used, for example, for ski lifts. Here each entrance lane is blocked with a turnstile or similar blocking element, which is enabled by a valid transponder. So as to be able to reliably read out the transponder in each carrying position of the skier, each entrance lane is monitored with two reading devices having mutually opposing antennas. So as to prevent a magnetic coupling of the two antenna coils, in the multiplex operation the two reading devices are activated alternately (cf. RFID-Handbook, Carl Hanser Verlag, Vienna-Munich, 2nd edition, 1999, page 333). Apart from the costs caused by two reading devices, the multiplex operation leads to a longer transaction time. Since the field strength of the respective antenna coil exponentially decreases with increasing distance, moreover, the reading reliability of the known apparatus leaves much to be desired down to the middle of the entrance lane, in particular when the transponder is covered e.g. by the body of the skier.

From DE 10 2004 013 965 B3 an access control apparatus is known, wherein the blocking element in its basic position releases the entrance and only blocks it upon an invalid reading of an access authorization and at the same time detection of a person by a people sensor. So as to the blocking element being able to take up its blocking position before the detected person without valid access authorization reaches the blocking element, a first antenna coil having a greater distance is provided before the blocking element, and additionally a second antenna coil with a smaller distance, so as to prevent that a person without valid access authorization waits in front of the blocking element until the entrance is released by a following second person with valid access authorization. The antenna coils arranged one behind the other are arranged in pairs at the two sides of the entrance lane, in order to capture the entire width of the entrance lane. But the reading reliability of the known apparatus still leaves much to be desired.

It is the problem of the invention to provide a simply structured access control system, with which a transponder can be reliably read out in a short transaction time.

This is achieved according to the invention with the access control system of the invention disclosed herein.

According to the invention for reading out the transponder with the access authorization at least two antenna coils are provided at mutually opposing sides, i.e. to the left and to the right of the entrance lane, or if a plurality of entrance lanes are provided, for example to a ski lift, at each entrance lane. The two antenna coils are actuated at the same time by a reading device, i.e. synchronous.

Each antenna coil produces a high-frequency field, which permeates the interior of the transponder coil. The frequency can be e.g. 135 kilohertz or less or 13.56 megahertz. By induction at the transponder coil a voltage is produced, on which is based the energy supply of the data carrier (microchip) of the transponder and at the same time the data transmission between reading device and transponder.

When the two antenna coils of the reading device are actuated in phase, the superposition of the individual fields of the antenna coils at the two sides of the entrance lane leads to field lines that extend transversely across the entrance lane. I.e., when the coil surface of the transponder coil is arranged alongside the entrance lane, i.e. in parallel to the antenna coils of the reading device, the transponder coil is permeated by the maximum number of field lines, so that the power consumption of the transponder and thus the reading reliability achieves its maximum.

However, with such field line course the power consumption and with that the reading reliability reaches its minimum, when the coil surface of the transponder coil is arranged at right angles to the entrance direction, i.e. perpendicular to the antenna coils of the reading device, since then the transponder coil is permeated not or in any case by only few field lines.

In contrast to the in-phase operation mode, the superposition of the individual fields of the two antenna coils in the antiphase operation mode leads to field lines that extend in particular in the middle of the entrance lane between the two antenna coils alongside the entrance lane. I.e., when the coil surface of the transponder coil is arranged at right angles to the entrance direction, i.e. in parallel to the antenna coils, the transponder coil is permeated by the maximum number of field lines, by means of which the maximum reading reliability is achieved.

Therefore, according to the invention, the two antenna coils of each pair are actuated by the reading device at the same time, but alternately either in phase or in antiphase.

Then the operation mode with which a transponder is detected in the entrance lane, i.e. answers for the first time, is maintained until the reading transaction is completed. I.e., when, for example, a transponder is carried such that the transponder coil is arranged alongside the entrance lane, it is detected and thus read out in the in-phase operation mode of the two antenna coils, while a transponder, for example, carried with the transponder coil at right angles to the entrance lane is detected and read out in the antiphase operation mode of the antenna coils.

So as to shorten the transaction time, it is advantageous to provide an online access to the access authorization and, optionally, to further application data. For this purpose the access authorization and, optionally, further application data can be stored in a database, which the reading device is connected to, together with a definite reference, for example the chip serial number of the transponder, so that from the transponder only the reference needs to be read out with the antenna coils of the reading device.

The invention can be used for access control apparatuses, wherein the or each entrance lane is blocked with a turnstile or similar blocking element that is enabled after a transponder with valid access authorization has been read out by the reading device. The blocking system can have e.g. a traffic light, which on blocking is changed to red and on releasing is changed to green, or a turnstile or similar blocking element. But the invention has proved to be especially suitable for access control apparatuses, which corresponding to DE 10 2004 013 965 B3 have an "open gate" basic position, in which the entrance is released, the blocking means only blocking the access upon invalid reading of an access authorization and detection of a person with a people sensor. Here in entrance direction a first and a second antenna coil pair are arranged one behind the other, the blocking element being actuatable in dependence on a valid or invalid reading of an access authorization with the first antenna coil pair and/or the second antenna coil pair.

Here for each antenna coil pair a reading device can be provided, or there is provided only one reading device that alternately actuates the two antenna coil pairs.

When two or more access barriers are provided, the access barriers preferably are operated in a parallel and asynchronous fashion. With that a multiplexer between the barriers is no longer necessary, which means a considerable saving of time.

The control system according to the invention can be used, for example, for transport apparatuses, in particular in skiing areas. It is obvious that it is also suitable for other applications, for example buildings, stadiums, public swimming pools and similar institutions.

In the following the invention is explained in more detail by way of example with reference to the attached Figure.

FIG. 1 shows a perspective view of an entrance lane having an access control apparatus for the "open gate" operation, the one antenna coil of the antenna coil pair adjoining the turning blocking device being left out;

FIG. 2 shows a schematic plan view onto the entrance lane according to FIG. 1, the turning blocking device being left out;

FIGS. 3 and 4 show sections of two opposite antenna coils of the apparatus according to FIGS. 1 and 2 with the field line course in an in-phase or in an antiphase operation mode;

FIG. 5 shows a plan view onto a transponder coil; and

Figure 6:
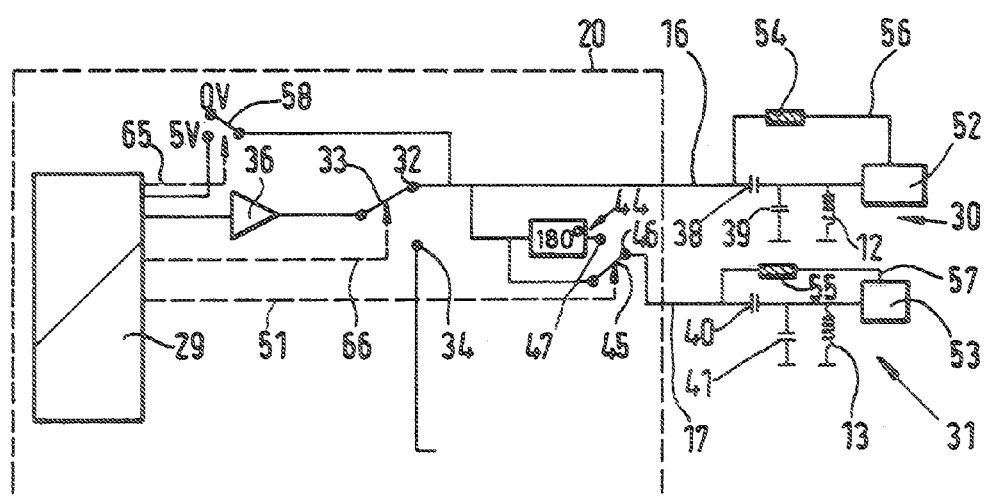
FIG. 6 shows an embodiment of a circuit configuration for the access control system according to the invention.

According to FIG. 1 the access control apparatus has a turning star with two barrier arms 2, 3 as blocking element 1 for blocking entrance lane 4, which is passed in the direction of arrow 5. Blocking element 1 is rotatable around axis 6 inclined in relation to the horizontal line. Each of the two barrier arms 2, 3 encloses an angle of about 45° with the axis of rotation 6 and with each other they enclose an angle of about 120°. FIG. 1 shows the barrier arms 2, 3 in the "open gate" basic position, where they release the entrance 4. By rotating the blocking element 1 corresponding to the arrow 7 the barrier arm 2 is turned upward into the position 2' represented by dashed lines in FIG. 1 and thus the entrance 5 is blocked. Instead of the two barrier arms 2, 3 only one single barrier arm can be provided, which with the rotation axis 6 encloses an angle of about 45° and is rotatable into the blocking position 2'. This barrier arm, selectively, can be rotatable always in the direction of passage (block-release) or can be moved in two directions.

According to FIGS. 1 and 2 in each of the housings 8, 9, 10, 11 an antenna coil 12, 13, 14 or 15 is arranged respectively. The antenna coil 12 and 13, which are arranged on opposite sides of the entrance lane 4, form a first antenna coil pair, and the antenna coils 14 and 15 form a second antenna coil pair. Antenna coils 12 to 15 are connected via HF-cable 16, 17, 18, 19 to a joint reading device 20 (FIG. 2). But it can also be provided that antenna coil pairs 12 and 13 or 14 and 15 respectively each have a reading device.

Reading device 20 actuates blocking element 1. With the in entrance direction 5 first antenna coil pair 12, 13 the access authorization is read out, which is stored in a microchip 21 of the transponder 22 (FIG. 5) carried by the user passing the entrance 4.

If with the first antenna coil pair 12, 13 a valid access authorization is read out, blocking element 1 will remain in release position, i.e. barrier arms 2 and 3 beside entrance lane 4 point downward. If, however, a person whose access authorization has been read as invalid passes the first antenna coil pair 12, 13 and at the same time a people sensor 23, e.g. a light barrier, barrier arm 2 will be swiveled into blocking position 2' shown in FIG. 1 by dashed lines. In order that the user, who then stands in front of barrier arm 2', cannot pass blocking element 1 when a second user having valid access authorization follows, after the detection of a person by people sensor 23 and without a valid reading the first antenna coil pair 12, 13 is deactivated and the second antenna coil pair 14, 15 is switched to an active position.

Here the access authorization of a following person is not detected. Instead, a second check of the access authorization of the person standing in front of barrier arm 2' is effected by antenna coil pair 14, 15. In case of a valid access authorization detected with the help of a second check effected by the antenna coil pair 14, 15, the antenna coil pair 12, 13 is switched to be active and the antenna coil pair 14, 15 is switched to be inactive and blocking element 1 again is turned into the release position.

According to FIG. 5 the RFID transponder 22 substantially consists of the antenna coil or transponder coil 24 with the microchip 21 as a data carrier.

Through the reading device 20 the active switched antenna coil pairs 12 and 13 or 14 and 15 produce a high-frequency field. Here the inductive coupling between the antenna coil pair 12 and 13 or 14 and 15 respectively with the transponder 22 is the stronger, the more field lines permeate the interior 25 of the transponder coil 24.

As shown in FIG. 3 for the active switched antenna coil pair 12 and 13, an in-phase activating of the two antenna coils 12, 13 by the reading device 20 leads to a superposition of the individual fields of the antenna coils 12, 13 at the two sides of entrance lane 4 to field lines 26, which substantially extend at right angles to entrance lane 4.

I.e., when the transponder 22 and thus the transponder coil 24 is arranged alongside the entrance lane 5, i.e. as shown in FIG. 3, in parallel to the antenna coils 12, 13, the interior 25 of the transponder 24 is permeated by the maximum number of field lines 26, so that the power consumption of the transponder 22 and thus the reading reliability achieves the maximum.

However, with the field line course 26 according to FIG. 3 the power consumption and thus the reading reliability is at its minimum, when the transponder coil 24 is arranged at right angles to the entrance direction, i.e. perpendicular to the antenna coils 12, 13, since then no, in any case only few field lines 26 permeate the transponder coil 24.

In contrast to the in-phase operation mode, the superposition of the individual fields of the two antenna coils 12, 13 in an antiphase operation mode according to FIG. 4 leads to field lines 27 which in particular extend in the middle of the entrance lane 4 between the two antenna coils 12 and 13 more alongside the entrance lane 4. I.e., when transponder coil 24 is arranged at right angles to entrance direction 5, i.e. in parallel to the antenna coils 12, 13, the interior 25 of the transponder coil 24 is permeated by the maximum number of field lines 27, as a result of which the reading reliability reaches its maximum.

Therefore, according to the invention, the two antenna coils 12, 13 are actuated at the same time, but alternately either in phase or in antiphase, by the reading device 20.

In the circuit configuration shown in FIG. 6 only the two parallel oscillating circuits 30, 31 for the two in FIGS. 1 and 2 first antenna coils 12 and 13 are displayed, which are connected to the one pole 32 of the diode switch 33, to whose other pole 34 the not displayed parallel circuits with the two according to FIGS. 1 and 2 second antenna coils 14 and 15 are connected. The circuitry of the oscillating circuits of the two antenna coils 14 and 15 connected to the pole 34 of the switch 33 are formed in the same way as the two parallel oscillating circuits 30, 31 connected to the pole 32 of the switch 33 as displayed in FIG. 6. The diode switch 33 is actuated by the transmitting-receiving electronics 29 of the reading device via control line 35 displayed by dashed lines.

According to FIG. 6 between the transmitting and receiving electronics 29 of the reading device 20 and switch 33 there is provided a driver 36. Pole 32 of switch 33 via a capacitor 38 is connected with parallel oscillating circuit 30 of antenna coil 12 and with the in parallel switched capacitor 39. In contrast, the capacitor 40 of the second parallel oscillating circuit 31, which consists of antenna coil 13 and capacitor 41, is connectable with the pole 32 of the switch 33 via a 180° phase switch 44.

Phase switch 44 consists of a diode switch 45, whose one pole 46 is connected directly with parallel oscillating circuit 30, while the other pole 47 leads to parallel oscillating circuit 31 via a transformer 48 having two coils 49, 50 for a 180° phase reversal. By switching diode switch 45, the in-phase operation mode of the two oscillating circuits 30, 31 can be switched into the antiphase operation mode.

When the access control apparatus is in operation, diode switch 45 is actuated by transmitting-receiving electronics 29 via control line 51 displayed by dashed lines and thereby is permanently switched back and forth between poles 46, 47. When transmitting-receiving electronics 29 detects a transponder 22, the operation mode, wherein the transponder 22 was detected, is maintained until the reading transaction is completed, i.e. the data exchange between transmitting-receiving electronics 29 and transponder 22 is completed.

I.e., when the transponder 22 according to FIG. 3 is carried e.g. in a side pocket and thus the transponder coil 24 is aligned with the entrance direction 5, i.e. in parallel to the antenna coils 12, 13, and thus the transponder 22 is detected in the in-phase operation mode, i.e. when the diode switch 45 is connected to the pole 46, this operation mode is maintained until the reading transaction is completed, whereas, when the transponder 22 with the transponder coil 24 according to FIG. 4 is carried e.g. in a breast pocket and the transponder 22 thus is detected in the antiphase operation mode, i.e. with the diode switch 45 connected to the pole 47, the antiphase operation mode is maintained during the data exchange. After the end of the transaction, via the control line 51 the switching back and forth of the diode switch 45 is continued.

The invention claimed is:

1. An access control system comprising at least one access lane which extends in an access direction and is equipped with a plurality of antenna coils juxtaposed in pairs and lined up in the access direction wherein said pairs comprise at least first and second pairs of said antenna coils, said pairs of antenna coils being controlled by reading means adapted to read data from a user-carried transponder, which indicates an access privilege of the user, and said reading means having a transponder coil for coupling with said antenna coils, and said access control system comprising a person detector detecting a user in said access lane in a read transaction and a blocking system which in a basic condition deblocks the access lane allowing passage therethrough by a user and is operable to a blocking condition to block said access lane only in case said person detector detects a user in the read transaction and said reading means detects an invalid access privilege, said blocking system configured to be actuated in dependence on the valid or invalid reading of the access privilege by means of said first pair of antenna coils and/or said second pair of antenna coils, characterized in that the juxtaposed antenna coils of each said pair being excited simultaneously but alternatingly in an in-phase or an oppositely phased operating mode, in that the transponder carried by a user being read by upholding the operating mode which results in the detection of said transponder until the read transaction completes reading of the data from the transponder and the read transaction is terminated, in that said antenna coils each generate an RF field having RF field lines which induce in said transponder coil a voltage to supply power to data storage means in said transponder storing said data and for the transmission of the data between said reading means and said transponder, and in that in the in-phase mode of operation of the antenna coils of one of said pairs of said antenna coils, and with a major surface of said transponder coil being disposed so as to extend along said access direction of said access lane, the power intake of said transponder is maximum whereas in the oppositely phased mode of operation, and with the major surface of transponder coil transverse to said access direction, said transponder coil has a maximum of field lines of said RF field passing therethrough.

2. The access control system according to claim 1, characterized in that for switching between the in-phase and the antiphase operation mode and for maintaining the respective operation mode while detecting the transponder, one said antenna coil of the antenna coil pair is actuated with a 180° phase switch, which is actuated by transmitting-receiving electronics of the reading device for generating a 180° phase reversal.

3. The access control system according to claim 2, characterized in that the 180° phase switch has a diode switch.

4. The access control system according to claim 3, characterized in that the diode switch actuates the one antenna coil for the 180° phase reversal via a transformer.

5. The access control system according to claim 1, characterized in that the reading device reads out identification data from the transponder and a database is provided for the online access to the access authorization data.

6. The access control system according to claim 1, characterized in that the blocking system is formed by a blocking element which is movable to block and unblock said access lane.

7. The access control system according to claim 1, characterized in that a switch is provided which alternatingly switches between said in-phase and said oppositely phased operating modes, said operating mode being maintained without switching until said read transaction is complete and thereafter, switching between said in-phase and said oppositely phased operating modes continues.

8. The access control system according to claim 1, characterized in that said operating mode alternatingly switches between said in-phase and said oppositely phased operating modes, wherein said operating mode being maintained without switching until said read transaction is complete and thereafter, switching between said in-phase and said oppositely phased operating modes continues.

* * * * *

UNITED STATES PATENT AND TRADEMARK OFFICE
CERTIFICATE OF CORRECTION

Page 1 of 1

PATENT NO. : 8,174,356 B2
APPLICATION NO. : 11/891034
DATED : May 8, 2012
INVENTOR(S) : Gregor Ponert and Rudolf Golser It is certified that error appears in the above-identified patent and that said Letters Patent is hereby corrected as shown below:

On the Title page, Item (75) Inventors should read: Gregor Ponert, Salzburg (AT), Rudolf Golser, Hallein (AT)

Signed and Sealed this
Nineteenth Day of June, 2012

David J. Kappos
*Director of the United States Patent and Trademark Office*